2,807,644

PANTETHINE INHIBITORS

James A. Moore and Eugene L. Wittle, Detroit, Mich., assignors to Parke, Davis & Company, Detroit, Mich., a corporation of Michigan No Drawing. Application August 20, 1954,
Serial No. 451,308

14 Claims. (Cl. 260—561)

This invention relates to new amides and to a process for preparing the same. More particularly, the invention relates to pantothenyl amide compounds having the formula

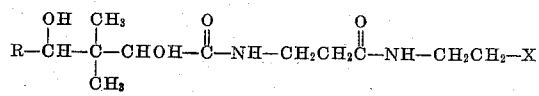

where R is hydrogen or a methyl group and X is hydrogen or a hydroxyl group.

In accordance with the invention pantothenyl amide compounds having the formula given above are produced by condensing a lactone of formula

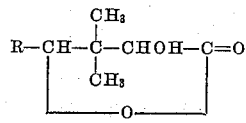

with a β-aminopropionamide compound of formula

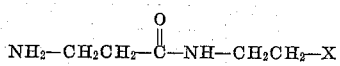

where R and X have the same significance as given above. Using these same symbols the reaction can be represented diagrammatically as follows:

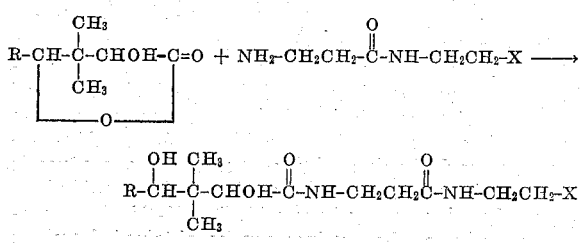

The condensation may be carried out in the presence or absence of a solvent. As solvents, lower aliphatic alcohols, hydrocarbons, lower aliphatic ethers, and a mixture of the same, can be used. The best results are obtained by using a substantially anhydrous lower aliphatic alcohol as a solvent at a reaction temperature of 20–100° C. The relative quantity of the two reactants is not particularly critical, however, in most instances it is preferable to use a slight excess of the lactone. The β-aminopropionamide compound can be employed per se or generated in situ by reaction of an acid addition salt with an equivalent amount of an alkaline material such as an alkali or alkaline earth metal hydroxide, carbonate or alkoxide.

The products of the invention, possess the property of inhibiting the ability of certain microorganisms to utilize pantethine, pantetheine, pantothenic acid and similar factors which they require for growth.

The invention is illustrated by the following examples.

Example 1

A mixture consisting of 337 mg. of β-amino-N-hydroxyethylpropionamide hydrochloride, 132 mg. of (−) pantolactone, 2 ml. of N methanolic sodium methoxide and 25 ml. of methanol is allowed to stand for 65 hours at 25° C. The solvent is evaporated and the residue is extracted with ethanol-acetone (50–50) to remove the sodium chloride. The extract is filtered and the solvent removed by distillation. The residual oil is placed in a short-path-distillation flask and distilled at a bath temperature of 160° C., at a pressure of $10^{-3}$ mm. of mercury. The colorless oily distillate so obtained is N(+)pantothenyl-2-hydroxyethylamine of formula:

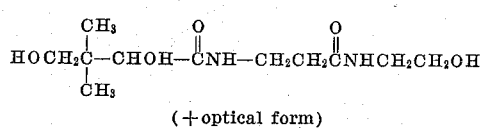

(+optical form)

N-(+)-pantothenyl-2-ethanolamine shows characteristic maxima absorption bands in the infrared region of the spectrum when examined by the liquid film technic at wave lengths 2.97, 3.34, 6.07, 6.46, 6.82, 6.94, 7.30, 7.91 and 9.54μ.

N-(+)-pantothenyl-2-ethanolamine possesses an inhibition index of 90 against pantethine for *Lactobacillus helveticus*. This index is determined in the following manner:

Concentrations of pantethine varying from 0.05 to 0.5γ of pantethine are added to a series of tubes which contain 10 ml. of the nutrient medium of Craig and Snell [J. Bact. 61,283 (1951)]. The tubes are autoclaved for 5 minutes at 15 lbs. per sq. in. of pressure, cooled and inoculated with a saline suspension of *Lactobacillus helveticus*. The tubes are incubated for eighteen hours at 37° C. and then the amount of growth measured turbidimetrically. The concentration of pantethine which gives the maximum amount of growth is noted and this concentration used in the inhibition test. For example, if the concentration of pantethine which gives the maximum growth is 0.2γ, this amount is added to each of the tubes used in the inhibitor test.

For the inhibitor test a series of tubes are prepared containing 10 ml. of the nutrient medium, the concentration of pantethine which in the growth test gives the maximum growth and varying concentrations of the substance to be tested as an inhibitor. The tubes are autoclaved for 5 minutes at 15 lbs. per sq. in. pressure, cooled and inoculated with a saline suspension of *Lactobacillus helveticus*. The tubes are incubated for eighteen hours at 37° C., and the amount of growth measured turbidimetrically. The concentration of the substance which reduces the maximum growth to 50% of normal is taken as the end point. The inhibition index of the substance is then determined by dividing this concentration of the test substance by the concentration of pantethine necessary for maximum growth. Thus, the smaller the inhibition index the more effective the substance is as an inhibitor.

Example 2

A mixture consisting of 268 mg. of β-amino-N-ethylpropionamide hydrochloride, 274 mg. of (−) pantolactone, 1.75 ml. of 1 N methanolic sodium ethoxide and 25 ml. of methanol is allowed to stand for 65 hours at room temperature. The solution is filtered to remove the sodium chloride and the solvents distilled from the filtrate. The residue is extracted with acetone and absolute ethanol to remove traces of sodium chloride and the solvents distilled from the extract. The residual glass is distilled in a short-path still at $2 \times 10^{-4}$ mm. of mercury and the fraction distilled at a bath temperature of 110–125° C. collected. The colorless oil so obtained is N-(+)-pantothenyl-ethylamine of formula

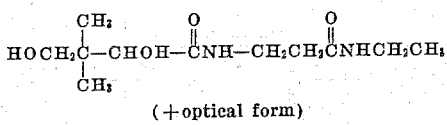

(+optical form)

N-(+)-pantothenyl-ethylamine shows characteristic maxima absorption bands in the infrared region of the spectrum when examined by the liquid film technic at wave lengths 2.96, 3.33, 6.02, 6.06, 6.46, 6.52, 6.82, 6.92, 7.23, 7.71, 7.94, 8.34, 8.66, 9.24 and 9.55μ.

N-(+)-pantothenyl-ethylamine possesses an inhibition index of 108 against pantethine for *Lactobacillus helveticus* when tested by the method described in Example 1.

Example 3

To 760 mg. of β-amino-N-ethylpropionamide hydrochloride (M. P. 133–134° C.) is added 10 ml. of methanol containing 115 mg. of sodium. After the completion of the reaction to form the insoluble sodium chloride, 720 mg. of unresolved ω-methylpantolactone in 5 ml. of methanol is added to the solution. The reaction mixture is heated to boiling and then allowed to stand at 24–25° C. for 16 hours. The insoluble sodium chloride is removed by filtration and the solution is again heated to reflux for 3 hours. The solvent is distilled from the reaction mixture under nitrogen and the residue extracted with 10 ml. of absolute ethanol. The extract is filtered to remove the sodium chloride and the ethanol evaporated from the filtrate. The residue is washed with 20 ml., 10 ml., and 10 ml., portions of ethyl ether. The ether insoluble residue is then dried in a vacuum desiccator over phosphoric anhydride and then distilled in a molecular still at a bath temperature of 100–120° C. and pressure of 10⁻³ mm. of mercury. The colorless oily product so obtained is unresolved N-(ω-methylpantothenyl) ethylamine of formula

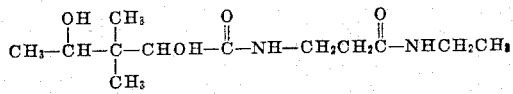

(optically racemic form)

Unresolved N-(ω-methylpantothenyl)-ethylamine shows characteristic maxima absorption bands in the infrared region of the spectrum when examined by the liquid film technic at wave lengths 2.98, 3.33, 6.05, 6.09, 6.40, 6.46, 6.54, 6.83, 6.94, 7.25, 7.72, 8.34, 8.69, 9.06, 9.38, 9.62 and 11.03μ.

Unresolved N-(ω-methylpantothenyl)-ethylamine possesses an inhibition index of 70–74 against pantethine for *Lactobacillus helveticus* when tested by the method described in Example 1.

Example 4

800 mg. of β-amino-N-hydroxyethylpropionamide hydrochloride is added to 10 ml. of methanol containing 115 mg. of sodium. After the reaction is complete, 720 mg. of unresolved ω-methylpantolactone in 5 ml. of methanol is added. The solution is heated to boiling and then allowed to stand at 24–25° C. for 16 hours. The sodium chloride is filtered off and the filtrate is refluxed for 3 hours. The solution is evaporated to dryness with a stream of nitrogen while being heated on a steam bath. The residual oil is extracted with 10 ml. of absolute ethanol and the extract filtered to remove the sodium chloride. The solvent is distilled from the filtrate and the residue extracted with four 10 ml. portions of ether. The ether insoluble residue is dried in a vacuum desiccator and then distilled in a molecular still. The fraction distilling at a bath temperature of 100–130° C. and pressure of 10⁻³ mm. of mercury is collected. The colorless oily product so obtained is unresolved N-(ω-methylpantothenyl)-2-hydroxyethylamine of formula

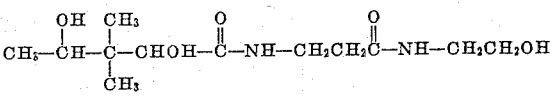

(unresolved form)

Unresolved N-(ω-methylpantothenyl)-2-hydroxyethylamine shows characteristic maxima absorption bands in the infrared region of the spectrum when examined by the liquid film technic at wave lengths 2.97, 3.32, 6.07, 6.45, 6.51, 6.82, 7.08, 7.73, 8.36, 8.76, 9.06, 9.37, 9.61 and 11.02μ.

Unresolved N-(ω-methylpantothenyl)-2-hydroxyethylamine possesses an inhibition index of 500 against pantethine for *Lactobacillus helveticus* when tested by the method described in Example 1.

From the foregoing description it will be apparent to those skilled in the art that the products of the invention can exist in different optical isomeric forms. In the case of the products wherein R is hydrogen there are two such optical forms while in the case of the products wherein R is a methyl group there are four such optical forms due to the presence of two asymmetric carbon atoms in these latter products. The optically active products can, as will be seen from the preceding examples, be obtained in the same manner as the optically racemic products, that is, by employing an optically active lactone rather than an optically racemic lactone as the starting material. In the present specification and claims it is to be understood that the chemical names and formulas are to be interpreted in their generic sense in the absence of a designation to the contrary, that is, as meaning each of the individual optical isomers as well as the optically racemic products. The term "unresolved" has been used herein to designate those substances which have not been separated into any of their possible isomeric forms.

The β-aminopropionamide compounds employed as starting materials in the practice of the invention can be prepared by reacting ethanolamine or ethylamine with phthalimidopropionyl chloride and hydrolyzing the resulting product with hydrazine. The following specific examples illustrate the application of this method.

(a) 36.7 g. of phthalimidopropionyl chloride is added to a mixture consisting of 13 ml. of ethanolamine, 4 g. of sodium hydroxide and 30 ml. of water keeping the temperature between 20–25° C. After the exothermic reaction has ceased the mixture is evaporated on a steam bath until salt begins to separate. The mixture is allowed to stand overnight and then treated with 3 ml. of concentrated hydrochloric acid in 20 ml. of water. The mixture is cooled and the crystalline β-phthalimido-N-β-(hydroxyethyl)propionamide collected. The product is washed with water and methanol and then purified by recrystallization from ethanol; M. P. 161–2° C. A further quantity of the product can be obtained from the reaction mixture filtrate by extraction with dioxane, followed by distillation of the dioxane from the extract, extraction of the residue with ether and finally distillation of the ether from the ether extract.

19.2 ml. of 1.1 N aqueous hydrazine solution is added dropwise over a period of twenty minutes with stirring to 5.25 g. of β-phthalimido-N-(β-hydroxyethyl) propionamide in 50 ml. of methanol keeping the temperature at 50° C. The mixture is stirred for one hour and then evaporated in vacuo to a volume of 15 ml.; 2 ml. of concentrated hydrochloric acid is added and the phthalhydrazide removed by filtration. The filtrate is evaporated to an oil and the oily residue stirred with methanol and acetone until it crystallizes. The β-aminopropion-N-hydroxyethylamide hydrochloride is collected and purified by recrystallization from methanol-ether mixture; M. P. 113–116° C.

(b) 22 ml. of a 70% aqueous solution of ethylamine is added with stirring to a mixture consisting of 23.7 g. of β-phthalimidopropionyl chloride, 15 ml. of dioxane and 100 ml. of water. The precipitate which forms is collected and the filtrate concentrated to a small volume. The solid is removed from the residue and after washing with water combined with the first precipitate. Recrystallization from methanol-ether mixture yields the desired β-phthalimido-N-ethylpropionamide in pure form; M. P. 183–5° C.

26 ml. of 1.1 N aqueous hydrazine is added over a period of one-half hour to a refluxing mixture of 6.54 g. of β-phthalimido-N-ethylpropionamide in 50 ml. of methanol. The mixture is heated for an additional hour and a half and then the solvent removed by distillation in vacuo. The residue is treated with 3 ml. of concentrated hydrochloric acid in 10 ml. of water, the precipitate removed by filtration and the filtrate evaporated to an oil. The oily residue is taken up in methanol-acetone mixture and allowed to stand at 0 to 5° C. The product is collected and the filtrate evaporated to dryness. The residue is crystallized from ethanol-ether mixture to obtain the desired β-amino-N-ethylpropionamide hydrochloride; M. P. 133–134° C.

We claim:

1. A pantothenyl amide compound having the formula

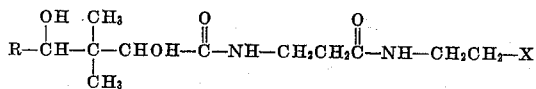

where R is a member of the class consisting of hydrogen and methyl and X is a member of the class consisting of hydrogen and hydroxyl.

2. N-pantothenyl-2-hydroxyethylamine.
3. N-(+)-pantothenyl-2-hydroxyethylamine.
4. N-pantothenyl ethylamine.
5. N-(+)-pantothenyl ethylamine.
6. N-(ω-methylpantothenyl) ethylamine.
7. Unresolved N-(ω-methylpantothenyl) ethylamine.
8. N-(ω-methylpantothenyl)-2-hydroxyethylamine.
9. Unresolved N - (ω - methylpantothenyl) - 2 - hydroxyethylamine.

10. Process for the production of a pantothenyl amide compound of formula

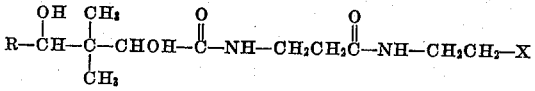

which comprises condensing at a temperature of 20° to 100° C. a lactone of formula

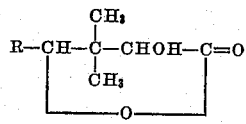

with a β-aminopropionamide compound of formula

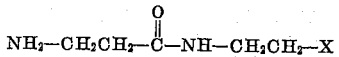

where R is a member of the class consisting of hydrogen and methyl and X is a member of the class consisting of hydrogen and hydroxyl.

11. Process for producing N-pantothenyl-2-hydroxyethylamine which comprises reacting pantolactone with β-amino-N-hydroxyethylpropionamide at about room temperature for about two days.

12. Process for producing N-(+)-pantothenyl ethylamine which comprises reacting pantolactone with β-amino-N-ethylpropionamide at about room temperature for about two days.

13. Process for producing N-(ω-methylpantothenyl) ethylamine which comprises reacting ω-methylpantolactone with β-amino-N-ethylpropionamide at boiling temperature.

14. Process for producing N-(ω-methylpantothenyl)-2-hydroxyethylamine which comprises reacting ω-methylpantolactone with β-amino-N-hydroxyethylpropionamide at boiling temperature.

References Cited in the file of this patent

UNITED STATES PATENTS 2,680,767    Snell et al. _____ June 8, 1954

FOREIGN PATENTS 216,824    Switzerland _____ Jan. 5, 1942